(No Model.)  
3 Sheets—Sheet 1.

T. H. NOXON.
CULTIVATOR.

No. 474,144. Patented May 3, 1892.

Witnesses  
J. Edw. Maybee  
H. G. McMillan

Inventor  
Thos. H. Noxon  
by Donald C. Ridout & Co  
Attys.

(No Model.)  
3 Sheets—Sheet 2.

T. H. NOXON.
CULTIVATOR.

No. 474,144.  
Patented May 3, 1892.

Witnesses  
J. Edw. Maybee  
N. G. McMillan

Inventor  
Thos. H. Noxon  
by Donald C. Ridout & Co.  
Attys.

(No Model.)  3 Sheets—Sheet 3.

T. H. NOXON.
CULTIVATOR.

No. 474,144. Patented May 3, 1892.

Witnesses
J. Edw. Maybee
H. G. McMillan

Inventor
Thos. H. Noxon
by Donald C. Ridout & Co
attys.

UNITED STATES PATENT OFFICE.

THOMAS H. NOXON, OF INGERSOLL, CANADA.

CULTIVATOR.

SPECIFICATION forming part of Letters Patent No. 474,144, dated May 3, 1892.

Application filed April 27, 1891. Serial No. 390,582. (No model.)

*To all whom it may concern:*

Be it known that I, THOMAS HENRY NOXON, of the town of Ingersoll, in the county of Oxford, in the Province of Ontario, Canada, have invented a certain new and useful Improvement in Cultivators, of which the following is a specification.

The object of the invention is to simplify the construction and improve the working of a cultivator; and it consists of the peculiar construction and arrangement of parts hereinafter explained and then definitely claimed.

Figure 1:
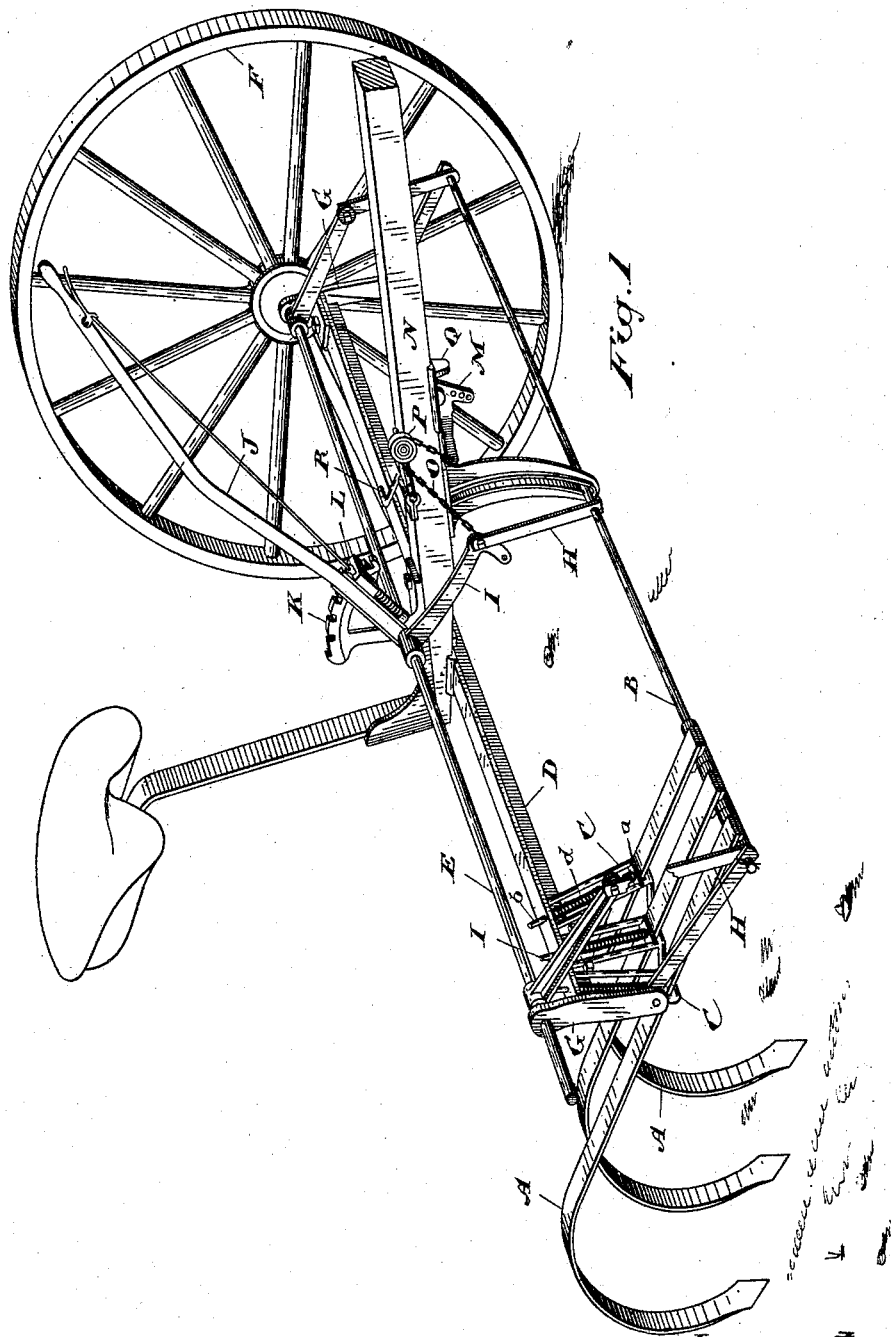
Figure 2:
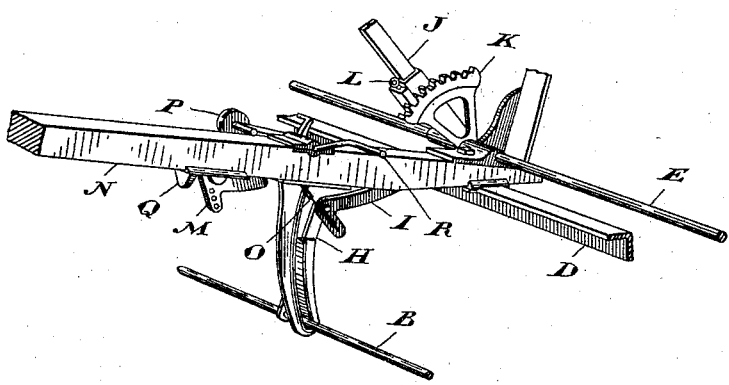
Figure 3:
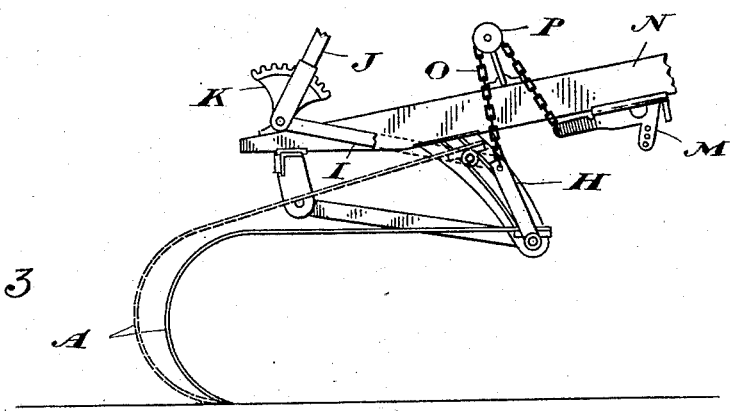

Figure 1 is a perspective view of my improved cultivator, having attached to it a sufficient number of cultivator-teeth to illustrate my invention. Fig. 2 is a perspective detail showing the mechanism by which the cultivator-teeth are tilted. Fig. 3 is a longitudinal sectional view.

The curved spring-teeth (marked A) are each made elastically pliable its entire length, and they are all independently pivoted upon a vertically-adjustable bar B. It will be observed that the teeth A are made unequal in length. Only three teeth are shown in the drawings; but it will be understood that they are arranged zigzag in the form shown the entire width of the machine. Each of the teeth A passes through a loop C. These loops are arranged zigzag to correspond with the unequal length of the teeth A—that is to say, each loop is located on its respective tooth in the same relative position between its pivoted end and cutting-point. By pivoting the teeth A on the loops C, as described, and connecting the ends of the teeth to the vertically-adjustable bar B and making the loops I zigzag I practically balance the teeth and parts connected therewith on the loop, which greatly assists the driver of the machine in raising its teeth out of the ground. On each loop an elastic pressure-bar is provided. In the drawings the said pressure-bar consists of a block *a*, held in the loop C and connected to a spindle *b*, passing through the angle-bar D. A spiral spring *d* is placed on the spindle *b*, and is designed to impart the required elastic pressure against the top of the tooth A. Owing to the position of these pressure-bars a uniform pressure against the teeth imparts a uniform pressure on the cutting end of each tooth.

I do not propose to confine myself to the exact form of pressure-bar illustrated in the drawings, as it would be an easy matter to design a number of different styles of pressure-bars which would answer the purpose desired.

E is the axle on which the ground-wheels F are journaled, the said axle being suitably supported and journaled in the brackets G, which are rigidly fitted to the angle-bar D in any suitable manner. The bar B, on which the teeth A are pivoted, is supported by the straps H, each strap being pivoted on the end of an arm I, rigidly fixed to the axle E in such a manner that the rolling of the said axle will cause the said bar B to be raised or lowered according to the direction in which the said axle is rolled. This motion is secured by pulling or pushing the hand-lever J, which is provided with a notched quadrant K and a spring-latch L for holding the said lever at any desired angle. A bell-crank M is pivoted on the bracket fixed to the tongue N. A doubletree is connected to one of the arms of the bell-crank M. The other arm of the said bell-crank is attached to a chain O, which is carried over the grooved pulley P and is connected to the joint between the central strap H and the arm I. A heel Q is located immediately in front of the doubletree-arm of the bell-crank M, so as to prevent the said arm being moved by the forward draft of the horses beyond a given point. As the teeth A are connected to the bar B and are fulcrumed by the loops C, the upward movement of the said bar B will throw the cutting-points of the teeth toward the ground. This action is accomplished by the movement of the hand-lever J. When it is desired that the horses should assist in forcing the cutting ends of the teeth A into the ground, the driver places his foot upon one end of the foot-lever R, on the other end of which lever the grooved pulley is carried. The tilting of the foot-lever R raises the pulley P and with it draws up the bell-crank M, moving its arm away from the heel Q, thus causing the forward draft of the horses to be directed toward raising the bar B, and thus contributing to the downward force upon the cutting-points of the teeth.

In addition to utilizing the draft of the horses for the purpose of imparting a downward force on the teeth the said draft also changes the angle of the said teeth, so that the point will lie in such a position in the ground that it will enter the ground more readily than it does before the bar B is elevated. This I illustrate by Fig. 3, in which I show one tooth A in full lines lying at its normal position, while in dotted lines I show it as it will appear after the forward end of it has been raised by the elevation of the bar B. For the purpose of illustrating this point I show the teeth and part connected therewith without a pressure-bar or loops for carrying the teeth, as my device would work without either the pressure-bar or the loops so far as the angling of the teeth is concerned. It is well known that when the teeth of a cultivator point vertically toward the ground they scratch and chatter over the ground, whereas when the angle is altered so that the points shall point toward the direction of the movement of the machine they act like a plow, so that the forward draft shall force them into the ground. When the teeth are in operation, this change of angle for the purpose stated requires considerable power, which is not always possible to properly give by a hand-lever. It is then that my invention, by which the forward draft of the horses is utilized for the purpose of producing this effect, becomes very important.

What I claim as my invention is—

1. In a cultivator, a vertically-adjustable bar B and spring-teeth pivoted thereon, a fulcrum located between the pivot-point and the cutting end of the tooth, and means, substantially as described, for adjusting the bar B to any desired position, as set forth.

2. In a cultivator, a vertically-adjustable bar B and spring-teeth pivoted thereon, in combination with an elastically-compressible fulcrum located between the pivot-point and cutting end of the tooth and means, substantially as described, for adjusting the bar B to any desired position, as set forth.

3. In a cultivator, a series of pivoted spring-teeth of unequal lengths, in combination with a series of pressure-bars, each bar located in such a position between the pivot-point and cutting end of its tooth that a uniform weight shall impart a substantially uniform pressure on the cutting end of each tooth.

4. In a cultivator, a vertically-adjustable bar B and spring-teeth pivoted thereon, in combination with an axle on which the ground-wheels are journaled, said axle being journaled on the frame, arms connecting said axle with the bar B, and means, substantially as described, for adjusting the bar B to any desired position, as set forth.

5. An arm fixed to a rock-shaft and having pivoted on it a strap connected to the bar on which the spring-teeth are pivoted, in combination with a chain or cord connected at one end to the arm and at the other end to one arm of a pivoted bell-crank to which the power is applied.

6. In a cultivator having pivoted spring-teeth, a tongue N, a bell-crank to which power is applied secured thereto, a pivoted foot-lever R, a pulley thereon, and a cord or chain passing over said pulley and connecting the bell-crank with the bar on which the teeth are pivoted, whereby pressure on the lever R will cause the forward draft of the horses to be utilized for applying downward pressure on the teeth, substantially as described.

7. In a cultivator, a bar B, teeth pivoted thereon, a bar D, a wheel-axle E, movable independent of said bar D, brackets G, secured to said bar D and forming bearings for the axle, and arms fixed to said axle and supporting said bar B, substantially as described.

8. A bar having on each end of it a bracket rigidly secured thereto, in which brackets the wheel-axle is journaled, and arms fixed to the said axle and supporting the bar on which the teeth are pivoted, in combination with loops projecting from the bar and forming guides and supports for the said teeth.

9. A bar having on each end of it a bracket rigidly secured thereto, in which brackets the wheel-axle is journaled, and arms fixed to the said axle and each arm connected by a pivoted link to the bar on which the teeth are pivoted, each end of the said bar being braced to the end bracket immediately opposite to it, in combination with a hand-lever rigidly fastened to the journaled axle and an arm also rigidly fastened to the axle and connected to the tooth-bar by a pivoted link.

10. A cultivator having teeth connected thereto by a horizontal pivot, from which point their working angle is varied, in combination with a draft device and intermediate mechanism between the draft device and teeth, whereby the said variation of the angle is effected and the teeth are caused to enter the soil at varying angles to its surface all by the draft of the horses, substantially as described.

11. A cultivator having teeth connected thereto by a horizontal pivot, from which point their working angle is varied, in combination with a draft device and intermediate mechanism between the draft device and the teeth, whereby the latter are presented to the soil at varying angles to its surface and are driven in and held there at the will of the operator, substantially as and for the purpose specified.

Toronto, April 23, 1891.

THOMAS H. NOXON.

In presence of—
 CHARLES C. BALDWIN,
 JOHN E. CAMERON.